(12) United States Patent
Yen et al.

(10) Patent No.: US 10,489,734 B2
(45) Date of Patent: Nov. 26, 2019

(54) MANAGED ASSESSMENT OF SUBMITTED DIGITAL CONTENT

(71) Applicant: Apple Inc., Cupertino, CA (US)

(72) Inventors: Andrew C. Yen, San Mateo, CA (US); Daniel D. Erlewine, Santa Cruz, CA (US); Dita R. Malaer, Mountain View, CA (US); Eric C. Finke, Scotts Valley, CA (US); Jason R. Suitts, San Francisco, CA (US); Jaya Kamath, Los Altos, CA (US); Max M. Muller, III, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/663,818

(22) Filed: Mar. 20, 2015

(65) Prior Publication Data
US 2015/0262108 A1   Sep. 17, 2015

Related U.S. Application Data

(62) Division of application No. 13/691,541, filed on Nov. 30, 2012, now Pat. No. 8,990,188.

(51) Int. Cl.
*G06Q 10/06* (2012.01)
*G06Q 30/06* (2012.01)
(Continued)

(52) U.S. Cl.
CPC ... *G06Q 10/06395* (2013.01); *G06Q 30/0631* (2013.01); *G06Q 50/00* (2013.01);
(Continued)

(58) Field of Classification Search
None
See application file for complete search history.

(56) References Cited

U.S. PATENT DOCUMENTS

| | | |
|---|---|---|
| 4,750,119 A | 6/1988 | Cohen et al. |
| 5,253,165 A | 10/1993 | Leiseca et al. |

(Continued)

FOREIGN PATENT DOCUMENTS

| | | |
|---|---|---|
| EP | 1 684 223 | 7/2006 |
| EP | 2 230 620 | 9/2010 |

(Continued)

OTHER PUBLICATIONS

"AVCataloger Overview," NC Software, Inc., http://avcataloger.com/Products.aspx, downloaded Oct. 6, 2003, pp. 1-4.

(Continued)

*Primary Examiner* — Wilson Lee
(74) *Attorney, Agent, or Firm* — Blank Rome LLP

(57) ABSTRACT

Methods and systems for managing assessment of media content electronically submitted to a network-based media distribution system. A submitter can prepare a media package that is associated with a particular media asset (e.g. media title), and then electronically submit the media package to the media distribution system. The media distribution system can then process the media package to produce various components that are used by the media distribution system to electronically distribute media content of the media asset. According to one aspect, the media distribution system can manage a review process on the various components so that the components can be individually approved or rejected. According to another aspect, embodiments pertain to a reviewer's workspace that can assist a user in reviewing the submitted media content. According to still another aspect, embodiments can utilize a plurality of reviewers to review various media assets that have been submitted.

19 Claims, 8 Drawing Sheets

(51) Int. Cl.
*G06Q 50/00* (2012.01)
*G06Q 50/18* (2012.01)
*H04L 29/08* (2006.01)

(52) U.S. Cl.
CPC ........... *G06Q 50/01* (2013.01); *G06Q 50/184* (2013.01); *H04L 67/02* (2013.01)

(56) References Cited

U.S. PATENT DOCUMENTS

| | | |
|---|---|---|
| 5,410,598 A | 4/1995 | Shear |
| 5,535,383 A | 7/1996 | Gower |
| 5,627,973 A | 5/1997 | Armstrong et al. |
| 5,752,128 A | 5/1998 | Yamashita |
| 5,765,152 A | 6/1998 | Erikson |
| 5,884,280 A | 3/1999 | Yoshioka et al. |
| 5,943,422 A | 8/1999 | Van Wie et al. |
| 6,067,531 A | 5/2000 | Hoyt et al. |
| 6,085,253 A | 7/2000 | Blackwell et al. |
| 6,151,643 A | 11/2000 | Cheng et al. |
| 6,226,618 B1 | 5/2001 | Downs et al. |
| 6,233,682 B1 | 5/2001 | Fritsch |
| 6,263,313 B1 | 7/2001 | Milsted et al. |
| 6,275,954 B1 | 8/2001 | Herman et al. |
| 6,330,670 B1 | 12/2001 | England et al. |
| 6,338,044 B1 | 1/2002 | Cook et al. |
| 6,341,353 B1 | 1/2002 | Herman et al. |
| 6,345,256 B1 | 2/2002 | Milsted |
| 6,363,486 B1 | 3/2002 | Knapton, III |
| 6,363,488 B1 | 3/2002 | Ginter et al. |
| 6,385,596 B1 | 5/2002 | Wiser et al. |
| 6,389,592 B1 | 5/2002 | Ayres et al. |
| 6,546,555 B1 | 4/2003 | Hjelsvold et al. |
| 6,549,922 B1 | 4/2003 | Srivastava et al. |
| 6,587,837 B1 | 7/2003 | Spagna et al. |
| 6,591,420 B1 | 7/2003 | McPherson et al. |
| 6,658,476 B1 | 12/2003 | Van |
| 6,691,149 B1 | 2/2004 | Yokota et al. |
| 6,731,312 B2 | 5/2004 | Robbin |
| 6,754,895 B1 | 6/2004 | Bartel et al. |
| 6,873,992 B1 | 3/2005 | Thomas |
| 6,874,003 B2 | 3/2005 | Morohashi |
| 6,910,049 B2 | 6/2005 | Fenton et al. |
| 6,938,005 B2 | 8/2005 | Iverson et al. |
| 6,963,839 B1 * | 11/2005 | Ostermann ............. G10L 13/08 704/2 |
| 7,073,193 B2 | 7/2006 | Marsh |
| 7,076,445 B1 | 7/2006 | Cartwright |
| 7,168,012 B2 | 1/2007 | Clauss et al. |
| 7,209,892 B1 | 4/2007 | Galuten et al. |
| 7,275,243 B2 | 9/2007 | Gibbons et al. |
| 7,308,413 B1 | 12/2007 | Tota et al. |
| 7,383,233 B1 | 6/2008 | Singh et al. |
| 7,624,046 B2 | 11/2009 | Galuten et al. |
| 7,685,512 B2 | 3/2010 | Hanson et al. |
| 7,729,946 B2 | 6/2010 | Chu |
| 7,739,256 B2 | 6/2010 | Powell |
| 7,756,920 B2 | 7/2010 | Muller et al. |
| 7,827,162 B2 | 11/2010 | Suitts et al. |
| 7,844,548 B2 | 11/2010 | Robbin et al. |
| 7,860,830 B2 | 12/2010 | Mirrashidi et al. |
| 7,962,634 B2 | 6/2011 | Cortos et al. |
| 8,015,237 B2 | 9/2011 | Muller |
| 2001/0021926 A1 | 9/2001 | Schneck et al. |
| 2001/0037207 A1 | 11/2001 | Dejaeger |
| 2001/0044786 A1 | 11/2001 | Ishibashi |
| 2001/0054046 A1 | 12/2001 | Mikhailov et al. |
| 2002/0002541 A1 | 1/2002 | Williams |
| 2002/0004824 A1 | 1/2002 | Cuan et al. |
| 2002/0032658 A1 | 3/2002 | Oki et al. |
| 2002/0047899 A1 | 4/2002 | Son et al. |
| 2002/0049844 A1 | 4/2002 | Nishikawa |
| 2002/0073177 A1 | 6/2002 | Clark et al. |
| 2002/0077986 A1 | 6/2002 | Kobata et al. |
| 2002/0078211 A1 | 6/2002 | Natarajan et al. |
| 2002/0082857 A1 | 6/2002 | Skordin et al. |
| 2002/0087440 A1 | 7/2002 | Blair et al. |
| 2002/0091584 A1 | 7/2002 | Clark et al. |
| 2002/0099661 A1 | 7/2002 | Kii et al. |
| 2002/0099696 A1 | 7/2002 | Prince |
| 2002/0099801 A1 | 7/2002 | Ishii |
| 2002/0107803 A1 | 8/2002 | Lisanke et al. |
| 2002/0112171 A1 | 8/2002 | Ginter et al. |
| 2002/0116293 A1 | 8/2002 | Lao et al. |
| 2002/0124182 A1 | 9/2002 | Basco et al. |
| 2002/0143612 A1 | 10/2002 | Barik et al. |
| 2002/0143782 A1 | 10/2002 | Headings et al. |
| 2002/0152267 A1 | 10/2002 | Lennon |
| 2002/0152278 A1 | 10/2002 | Pontenzone et al. |
| 2002/0165811 A1 | 11/2002 | Ishii et al. |
| 2002/0186844 A1 | 12/2002 | Levy et al. |
| 2002/0198843 A1 | 12/2002 | Wang et al. |
| 2003/0005173 A1 | 1/2003 | Shah et al. |
| 2003/0033162 A1 | 2/2003 | Houssiaux et al. |
| 2003/0037242 A1 | 2/2003 | Yasuna et al. |
| 2003/0065717 A1 | 4/2003 | Saito et al. |
| 2003/0074465 A1 | 4/2003 | Tang et al. |
| 2003/0115144 A1 | 6/2003 | Stefik et al. |
| 2003/0120593 A1 | 6/2003 | Bansal et al. |
| 2003/0120928 A1 | 6/2003 | Cato et al. |
| 2003/0135424 A1 | 7/2003 | Davis et al. |
| 2003/0149742 A1 | 8/2003 | Bollerud |
| 2003/0182188 A1 | 9/2003 | Duchow |
| 2003/0208473 A1 | 11/2003 | Lennon |
| 2003/0226150 A1 | 12/2003 | Berberet et al. |
| 2003/0236886 A1 | 12/2003 | Oren et al. |
| 2004/0012618 A1 | 1/2004 | Finney et al. |
| 2004/0015427 A1 | 1/2004 | Camelio |
| 2004/0015445 A1 | 1/2004 | Heaven et al. |
| 2004/0034601 A1 | 2/2004 | Kreuzer |
| 2004/0039754 A1 | 2/2004 | Harple |
| 2004/0044949 A1 | 3/2004 | Rowe |
| 2004/0059929 A1 | 3/2004 | Rodgers et al. |
| 2004/0133605 A1 | 7/2004 | Chang et al. |
| 2004/0136698 A1 | 7/2004 | Mock |
| 2004/0143760 A1 | 7/2004 | Alkove et al. |
| 2004/0148598 A1 | 7/2004 | Kita et al. |
| 2004/0153968 A1 | 8/2004 | Ching et al. |
| 2004/0167858 A1 | 8/2004 | Erickson |
| 2004/0181459 A1 | 9/2004 | Wright |
| 2004/0205028 A1 | 10/2004 | Verosub et al. |
| 2004/0210481 A1 | 10/2004 | Quinlan et al. |
| 2004/0215733 A1 | 10/2004 | Gondhalekar et al. |
| 2004/0254883 A1 | 12/2004 | Kondrik et al. |
| 2004/0254949 A1 | 12/2004 | Amirthalingam |
| 2004/0267552 A1 | 12/2004 | Gilliam et al. |
| 2004/0267608 A1 | 12/2004 | Mansfield, Jr. et al. |
| 2004/0268451 A1 | 12/2004 | Robbin et al. |
| 2005/0015765 A1 | 1/2005 | Covell et al. |
| 2005/0021478 A1 | 1/2005 | Gautier et al. |
| 2005/0034164 A1 | 2/2005 | Sano et al. |
| 2005/0038813 A1 | 2/2005 | Apparao et al. |
| 2005/0050218 A1 | 3/2005 | Sheldon et al. |
| 2005/0050345 A1 | 3/2005 | Dowdy et al. |
| 2005/0071418 A1 | 3/2005 | Kjellberg et al. |
| 2005/0080743 A1 | 4/2005 | Ostrover et al. |
| 2005/0080788 A1 | 4/2005 | Murata et al. |
| 2005/0144635 A1 | 6/2005 | Boortz |
| 2005/0165656 A1 | 7/2005 | Frederick et al. |
| 2005/0182792 A1 | 8/2005 | Israel et al. |
| 2005/0197946 A1 | 9/2005 | Williams et al. |
| 2005/0216472 A1 | 9/2005 | Leon et al. |
| 2005/0240529 A1 | 10/2005 | Thomas |
| 2005/0246159 A1 | 11/2005 | Perla et al. |
| 2005/0267894 A1 | 12/2005 | Camahan |
| 2005/0278375 A1 | 12/2005 | Mitchko |
| 2005/0283394 A1 | 12/2005 | McGloin et al. |
| 2006/0008256 A1 | 1/2006 | Khedouri et al. |
| 2006/0015489 A1 | 1/2006 | Probst et al. |
| 2006/0041748 A1 | 2/2006 | Lockhart et al. |
| 2006/0048132 A1 | 3/2006 | Chen |
| 2006/0062426 A1 | 3/2006 | Levy et al. |
| 2006/0074754 A1 | 4/2006 | Toyohara et al. |
| 2006/0107046 A1 | 5/2006 | Raley et al. |
| 2006/0112101 A1 | 5/2006 | Young |

(56) References Cited

U.S. PATENT DOCUMENTS

| | | |
|---|---|---|
| 2006/0143264 A1 | 6/2006 | Payne et al. |
| 2006/0161604 A1 | 7/2006 | Lobo |
| 2006/0167751 A1 | 7/2006 | Maruyama |
| 2006/0167816 A1 | 7/2006 | Wang et al. |
| 2006/0212722 A1 | 9/2006 | Ginter et al. |
| 2006/0229929 A1 | 10/2006 | Hughes |
| 2006/0242640 A1 | 10/2006 | Pauly et al. |
| 2006/0272026 A1 | 11/2006 | Niwano et al. |
| 2006/0277096 A1 | 12/2006 | Levitus |
| 2006/0287966 A1 | 12/2006 | Srinivasaraghavan et al. |
| 2007/0011156 A1 | 1/2007 | Maron |
| 2007/0011178 A1 | 1/2007 | Dumitru et al. |
| 2007/0011709 A1 | 1/2007 | Katz et al. |
| 2007/0028269 A1 | 2/2007 | Nezu et al. |
| 2007/0033531 A1 | 2/2007 | Marsh |
| 2007/0050467 A1 | 3/2007 | Borrett et al. |
| 2007/0073694 A1 | 3/2007 | Picault et al. |
| 2007/0083471 A1 | 4/2007 | Robbin et al. |
| 2007/0106522 A1 | 5/2007 | Collins et al. |
| 2007/0108274 A1 | 5/2007 | Boardman et al. |
| 2007/0192352 A1 | 8/2007 | Levy |
| 2007/0208670 A1 | 9/2007 | Quoc |
| 2007/0220051 A1 | 9/2007 | Brentano et al. |
| 2007/0261088 A1 | 11/2007 | Phillips et al. |
| 2007/0265969 A1 | 11/2007 | Horwat et al. |
| 2007/0266028 A1 | 11/2007 | Muller et al. |
| 2007/0266047 A1 | 11/2007 | Cortes et al. |
| 2008/0040379 A1 | 2/2008 | Suitts et al. |
| 2008/0071614 A1 | 3/2008 | Mebruer |
| 2008/0077850 A1 | 3/2008 | Gauthier et al. |
| 2008/0120199 A1 | 5/2008 | Pirnack et al. |
| 2008/0133594 A1 | 6/2008 | Fotinatos et al. |
| 2008/0140493 A1 | 6/2008 | DeAngelis |
| 2008/0140537 A1 | 6/2008 | Powell et al. |
| 2008/0147530 A1 | 6/2008 | Kwan et al. |
| 2008/0147558 A1 | 6/2008 | Kraus |
| 2008/0155552 A1 | 6/2008 | Kim |
| 2008/0195651 A1 | 8/2008 | Rachmiel et al. |
| 2008/0249946 A1 | 10/2008 | Candelore |
| 2008/0288405 A1 | 11/2008 | John |
| 2008/0301058 A1 | 12/2008 | Campbell et al. |
| 2009/0037287 A1 | 2/2009 | Baitalmal et al. |
| 2009/0063543 A1 | 3/2009 | Martin et al. |
| 2009/0138117 A1 | 5/2009 | Bagwell et al. |
| 2009/0185669 A1* | 7/2009 | Zitnik ............... H04M 3/02 379/217.01 |
| 2009/0198830 A1 | 8/2009 | Zhang et al. |
| 2009/0240552 A1 | 9/2009 | Yang et al. |
| 2009/0259502 A1* | 10/2009 | Erlewine ........... G06Q 10/087 705/70 |
| 2009/0260060 A1 | 10/2009 | Smith et al. |
| 2009/0276332 A1 | 11/2009 | Gharabally et al. |
| 2009/0276333 A1 | 11/2009 | Cortes et al. |
| 2009/0276433 A1 | 11/2009 | Fosback et al. |
| 2009/0307201 A1 | 12/2009 | Dunning et al. |
| 2009/0307682 A1 | 12/2009 | Gharabally et al. |
| 2009/0307683 A1 | 12/2009 | Gharabally |
| 2010/0030607 A1* | 2/2010 | Holcombe ........ G06F 17/30053 705/59 |
| 2010/0114739 A1 | 5/2010 | Johnston |
| 2010/0115443 A1 | 5/2010 | Richstein |
| 2010/0205274 A1 | 8/2010 | Gharabally et al. |
| 2010/0235254 A1 | 9/2010 | Mirrashidi et al. |
| 2010/0235889 A1 | 9/2010 | Chu et al. |
| 2010/0251099 A1* | 9/2010 | Makower .............. G06Q 10/10 715/237 |
| 2010/0299219 A1 | 11/2010 | Cortes et al. |
| 2011/0023001 A1 | 1/2011 | Giffel |
| 2011/0035579 A1 | 2/2011 | Miura et al. |
| 2011/0060742 A1 | 3/2011 | Heller et al. |
| 2011/0060776 A1 | 3/2011 | Suitts et al. |
| 2011/0087553 A1* | 4/2011 | Mishra ................ G06Q 30/02 705/14.73 |
| 2011/0225417 A1 | 9/2011 | Maharajh et al. |
| 2011/0288910 A1* | 11/2011 | Garg ................ G06Q 30/0207 705/14.1 |
| 2012/0023015 A1 | 1/2012 | Mathai et al. |
| 2012/0117026 A1* | 5/2012 | Cassidy ........... G06F 17/30053 707/634 |
| 2012/0210219 A1 | 8/2012 | Agnoli et al. |
| 2012/0254456 A1 | 10/2012 | Visharam et al. |
| 2012/0311624 A1* | 12/2012 | Oskolkov .......... H04N 21/2541 725/25 |
| 2013/0046977 A1 | 2/2013 | Venters et al. |
| 2013/0097261 A1* | 4/2013 | Baer ..................... H04L 51/12 709/206 |
| 2013/0262564 A1* | 10/2013 | Wall ................. H04N 21/2743 709/203 |
| 2013/0339807 A1* | 12/2013 | Umeroglu ............. H04N 9/87 714/49 |
| 2014/0150025 A1* | 5/2014 | Pratt ................. H04N 21/4621 725/41 |

FOREIGN PATENT DOCUMENTS

| | | |
|---|---|---|
| JP | 2002-041482 | 2/2002 |
| JP | 2006-272000 | 10/2006 |
| JP | 2008-142548 | 6/2008 |
| JP | 2009-048340 | 3/2009 |
| WO | 1997/004410 | 2/1997 |
| WO | 1998/049644 | 11/1998 |
| WO | 2000/008909 | 2/2000 |
| WO | 2002/048920 | 6/2002 |
| WO | 2004/019182 | 3/2004 |

OTHER PUBLICATIONS

"Digital Audio Best Practices Version 2.1," by Digital Audio Working Group, Oct. 2006, http:/www.mndigital.org.digitizing/standards/audio.pdf.

"Gracenote CDDB," Gracenote, product webpage, http://www.gracenote.com/gn_products/cddb.html, downloaded Oct. 7, 2003, pp. 1-2.

"Gracenote MusicID," Gracenotem product webpage, http://www.gracenote.com/gn_products/cddb.html, downloaded Oct. 7, 2003, pp. 1-2.

"Media Encoding FAQ," Loudeye Corp., http://loudeye.com/digitalmedia/solutions/mediaenchost/encodingfaq.asp, downloaded Oct. 9, 2003, pp. 1-3.

"Media Encoding," Loudeye Corp., http://www.loudeye.com/digitalmedia/solutions/mediaenchost/encoding,aso, downloaded Oct. 9, 2003, pp. 1-4.

"Media Hosting," Loudeye Corp., http://www.loudeye.com/digitalmedia/solutions/mediaenchost/hosting.asp, downloaded Oct. 9, 2003, pp. 1-2.

MPEG-7 Multimedia Description Schemes XM (Version 2.0). ISO/IEC, Mar. 2000, pp. 1-138.

"Music Collector Features," Collectorz.com music collector features, http://www.collectorz.com/music/features.php, downloaded Oct. 7, 2003, pp. 1-2.

"Preview and Convera Announce Availability of Digital Media Commerce Platform for Secure Digital Audio Devices," Convera Press release, Las Vegas, NV, Consumer Electronics Show, Jan. 8, 2001, pp. 1-3.

"Radified Guide to Ripping & Encoding CD Audio," http://mp3.radified.com, downloaded Oct. 7, 2003, pp. 1-5.

"Sono Press Global Network User Manual: Client Tools, Upload Data/Graphics Files to Sonopress," Sonopress, date unknown.

"Liquifier Pro 4.0 for Windows TM User's Guide," 1998, Liquid Audio, Inc., 1998.

* cited by examiner

MANAGED ASSESSMENT OF SUBMITTED DIGITAL CONTENT

BACKGROUND

Today, online stores, such as the iTunes™ Store provided by Apple Inc. of Cupertino, Calif., allow customers (i.e., online users) via the Internet to purchase or rent media items (such as music, videos) or software programs. Often, at online stores, numerous digital items are made available and are provided by various different providers, such as music labels, movie companies, and application developers. Software tools, such as iProducer™ and iTunes Connect™ available from Apple Inc., can assist providers with online submission of digital items to the iTunes™ Store.

Since submission involves transmission of digital files over the Internet to online stores for distribution, the submission process can be time consuming to a submitter. When the digital files are large or voluminous, the transmission of the digital files for the submission can take a substantial duration of time. Even after the time consuming transmission has been endured, the digital files of the submission may fail quality checks. That is, submissions of digital files, such as media items, are typically encoded and then reviewed before being made available for distribution. The review of submissions is also time consuming and often the submissions are rejected due to some part of the submissions being defective, wrong or of poor quality. In such cases, the submitter is typically notified of the problem(s) with the prior submission. The submitter can then act to correct the problem(s) and resubmit the entire submission.

Unfortunately, however, given that submissions are often rejected and then later resubmitted, performing quality review of submissions can be inefficient since reviewers can be required to re-review submissions. Consequently, there is a need for improved approaches to manage review of submissions of digital assets for online distribution.

SUMMARY

The invention pertains to methods and systems for managing assessment of media content electronically submitted to a network-based media distribution system. A submitter can prepare a media package that is associated with a particular media asset (e.g., media title), and then electronically submit the media package to the network-based media distribution system. The network-based media distribution system can then process the media package to produce various components that are used by the network-based media distribution system to electronically distribute media content of the media asset to one or more geographic markets.

According to one aspect of one or more embodiments, prior to permitting distribution of the various components, the network-based media distribution system can manage a review process on the various components. In this regard, according to one embodiment, the network-based distribution system can facilitate enabling a reviewer to review individual components so that the components can be individually approved or rejected. Advantageously, a submitter (e.g., content provider) for media content can be advised to resubmit media content for those components that have been rejected.

According to another aspect of one or more embodiments, a reviewer's workspace can assist a reviewer in reviewing the submitted media content. In reviewing the components for the particular media asset, the reviewer's workspace can support a graphical user interface to assist the reviewer in reviewing the media content (namely, components for the particular media asset). According to still another aspect of one or more embodiments, the network-based media distribution system can utilize a plurality of reviewers to review various media assets that have been submitted to a network-based media distribution system for distribution.

Embodiment of the invention can be implemented in numerous ways, including as a method, system, device, or apparatus (including graphical user interface and computer readable medium). Several embodiments of the invention are discussed below.

As a method for review of digital media assets submitted to a media distribution system, one embodiment can, for example, include at least the acts of: receiving a media package pertaining to a media title and including a plurality of media assets for the media title; creating a component container for the media title; encoding the plurality of media assets for the media title; placing the encoded media assets into the component container; forwarding the component container to a review queue for subsequent review; retrieving, subsequent to the forwarding, from the review queue a component container to be reviewed; and enabling review of individual components within the component container, wherein a reviewer is able to individually approve or reject the individual components within the component container.

As a for reviewing digital media assets for a media title to be made available from a media distribution system, one embodiment can, for example, include at least the acts of: receiving a component container for a media title; presenting at least a plurality of non-approved components of the component container; enabling review of individual components within the component container, the individual components being able to be individually reviewed including at least the plurality of non-approved components; and enabling individual approval of one or more of the plurality of non-approved components.

As a method for reviewing digital media assets for a media title to be made available from a media distribution system, one embodiment can, for example, include at least the acts of: selecting a component set for review based on a priority associated with the component set, the component set being associated with the media title; assigning the component set to a reviewer; presenting metadata of the media title associated with the component set; receiving an indication of approval or rejection or modification of the metadata of the media title by a reviewer; presenting, for the reviewer, at least a plurality of non-approved components of the component set; and receiving an indication of approval or rejection of individual components within the component set by the reviewer, the individual components being able to be individually reviewed including at least the plurality of non-approved components.

As a computer readable medium including at least computer program code for review of digital media assets submitted to a media distribution system, one embodiment can, for example, include at least: computer program code for receiving a media package pertaining to a media title and including a plurality of media assets for the media title; computer program code for creating a component container for the media title; computer program code for encoding the plurality of media assets for the media title; computer program code for placing the encoded media assets into the component container; computer program code for forwarding the component container to a review queue for subsequent review; computer program code for retrieving, subsequent to the forwarding, from the review queue a component container to be reviewed; and computer program code for enabling review of individual components within the component container, wherein a reviewer is able to individually approve or reject the individual components within the component container.

As a computer readable medium including at least computer program code for reviewing digital media assets for a media title to be made available from a media distribution system, one embodiment can, for example, include at least: computer program code for receiving a component container for a media title; computer program code for presenting at least a plurality of non-approved components of the component container; computer program code for enabling review of individual components within the component container, the individual components being able to be individually reviewed including at least the plurality of non-approved components; and computer program code for enabling individual approval of one or more of the plurality of non-approved components.

As a computer readable medium including at least computer program code for reviewing digital media assets for a media title to be made available from a media distribution system, one embodiment can, for example, include at least: computer program code for selecting a component set for review based on a priority associated with the component set, the component set being associated with the media title; computer program code for assigning the component set to a reviewer; computer program code for presenting metadata of the media title associated with the component set; computer program code for receiving an indication of approval or rejection or modification of the metadata of the media title by a reviewer; computer program code for presenting, for the reviewer, at least a plurality of non-approved components of the component set; and computer program code for receiving an indication of approval or rejection of individual components within the component set by the reviewer, the individual components being able to be individually reviewed including at least the plurality of non-approved components.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF EMBODIMENTS OF THE INVENTION

Figure 1:
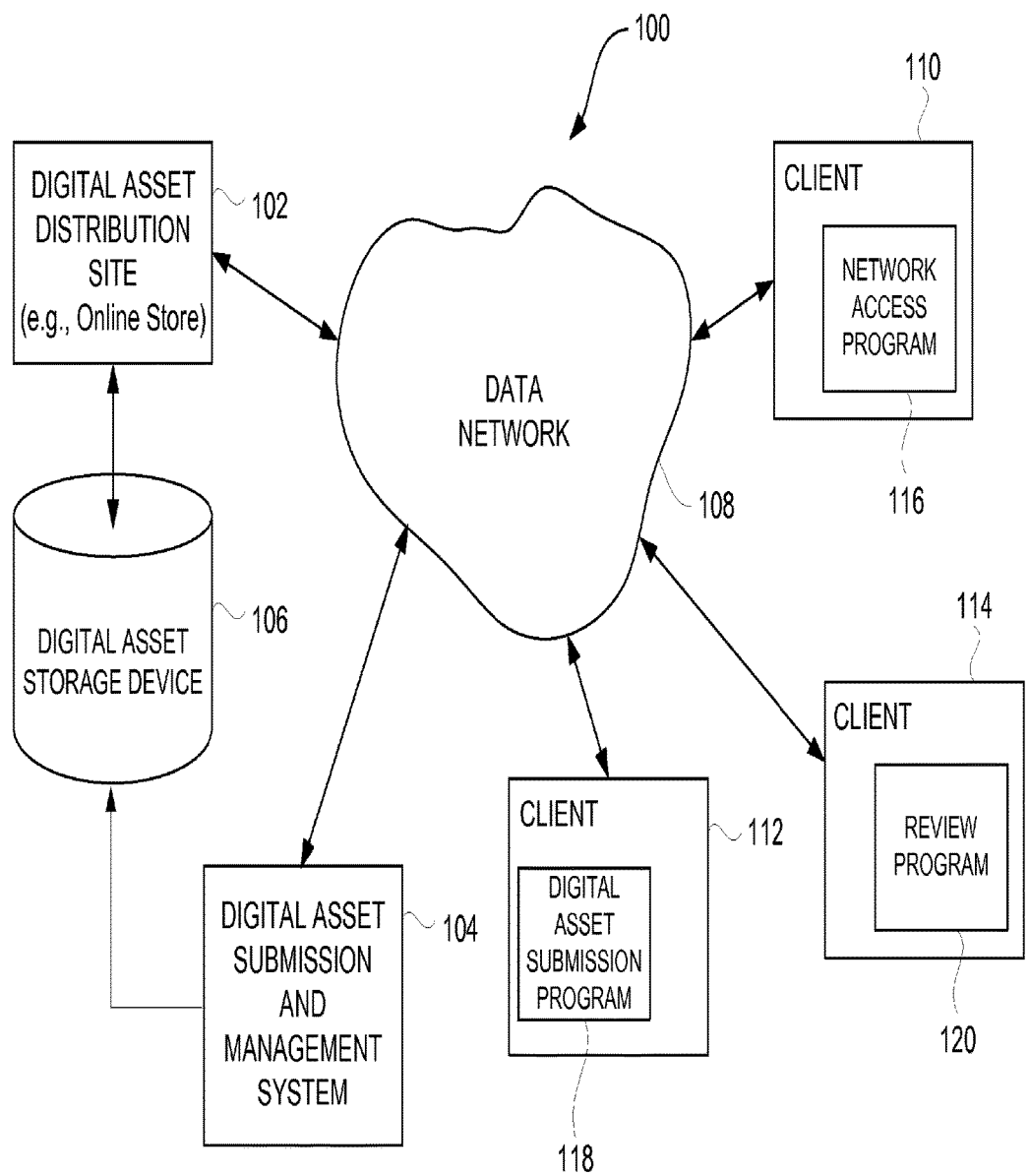
FIG. 1 illustrates a block diagram of a digital asset submission and distribution system according to one embodiment.

Various methods and systems for managing assessment of media content electronically submitted to a network-based media distribution system are described. A submitter can prepare a media package that is associated with a particular media asset (e.g., media title), and then electronically submit the media package to the network-based media distribution system. The network-based media distribution system can then process the media package to produce various components that are used by the network-based media distribution system to electronically distribute media content of the media asset to one or more geographic markets.

According to one aspect of one or more embodiments, prior to permitting distribution of the various components, the network-based media distribution system can manage a review process on the various components. In this regard, according to one embodiment, the network-based distribution system can facilitate enabling a reviewer to review individual components so that the components can be individually approved or rejected. Advantageously, a submitter (e.g., content provider) for media content can be advised to resubmit media content for those components that have been rejected.

Advantageously, a submitter (e.g., content provider) for media content can be advised to resubmit media content for those components that have been rejected. Consequently, once the submitter resubmits media content associated with the previously rejected components, the resubmitted media content can be similarly processed. However, to the extent that certain other components for the particular media asset have already been approved, those components need not be re-approved and thus need not be again reviewed.

According to another aspect of one or more embodiments, a reviewer's workspace can assist a reviewer in reviewing the media content (namely, components for the particular media asset). The reviewer's workspace can provide a graphical user interface that can assist a user in reviewing the submitted media content. For example, in reviewing the components for the particular media asset, a graphical user interface can be provided to assist the reviewer in reviewing the media content (namely, components for the particular media asset). Additionally, those components of the particular media asset that still need to be reviewed can be presented to the user by the graphical user interface, and can also be downloaded to the reviewer's workspace (e.g., computer) to facilitate local review by the reviewer.

According to still another aspect of one or more embodiments, embodiments of the network-based media distribution system can utilize a plurality of reviewers to review various media assets that have been submitted to a network-based media distribution system for distribution. Hence, each of the reviewers can have an associated workspace, and the delegation of a particular media package to a particular reviewer can be performed based on priority with respect to the media assets that have been submitted and are waiting for review. As noted above, once a particular media package has been assigned to the workspace for a particular reviewer, the particular reviewer is able to examine (e.g., play) one or more components thereof. In doing so, the reviewer is able to approve or reject individual ones of the components.

The various aspects, features, embodiments or implementations of the invention described above can be used alone or in various combinations.

Embodiments of various aspects of the invention are discussed below with reference to FIGS. 1-6. However, those skilled in the art will readily appreciate that the detailed description given herein with respect to these figures is for explanatory purposes as the invention extends beyond these limited embodiments.

FIG. 1 illustrates a block diagram of a digital asset submission and distribution system 100 according to one embodiment. The digital asset submission and distribution system 100 includes a digital asset distribution site 102. The digital asset distribution site 102 provides an online access point for distribution of various digital assets. For example, the digital asset distribution site 102 can be referred to as an online store. A digital asset submission and management system 104 operates to receive submissions of digital assets from various digital asset submitters. The digital asset submission and management system 104 can process submission of digital assets and authorize distribution of approved digital assets. The digital assets can be stored in a digital asset storage device 106. In one embodiment, the digital asset storage device 106 includes a mass data store and one or more databases. The digital asset storage device 106 provides mass storage of the numerous digital assets that are available for distribution (e.g., purchase or rental). For example, digital assets that have been purchased can be accessed from the digital asset storage device 106 over a data network 108 by way of the digital asset distribution site 102. Examples of digital assets include digital media assets (e.g., media items) or computer program products. Digital media assets can pertain to music (e.g., songs or albums) or video (e.g., movies or television shows). Computer program products can pertain to applications (or application programs), animations, or presentations.

The digital asset submission and distribution system 100 also includes a first client 110, a second client 112 and a third client 114. Typically, the digital asset submission and distribution system 100 would include a plurality of different clients, such as the clients 110, 112, 114. The first client 110 can include a network access program 116. The second client 112 can include a digital asset submission program 118. The third client 114 can include a review program 120. Some clients can also include both the network access program 116 and the digital asset submission program 118. The network access program 116 is an application program (e.g., software application) that operates on the first client 110, which is a computing device. One example of a suitable network access program is a network browser (e.g., Microsoft Explorer™ or Safari™). Another example of a suitable network access program is iTunes™ offered by Apple Inc. The first client 110 is coupled to the digital asset distribution site 102 through the data network 108. Hence, the first client 110 can interact with the digital asset distribution site 102 to review, purchase and/or manage digital assets.

The digital asset submission program 118 is also an application program (e.g., software application) that operates on the second client 112, which is a computing device. The digital asset submission program 118 is used to submit digital assets to the digital asset submission and management system 104 for eventual distribution by the media distribution site 102. Although the network access program 116 and the digital asset submission program 118 are shown in FIG. 1 as separate programs, it should be understood that such programs can be integrated into a single program or reside on the same client machine.

The review program 120 is also an application program (e.g., software application) that operates on the third client 114, which is a computing device. The review program 120 is used to facilitate review of the submitted digital assets by a reviewer to approve or reject the submitted digital assets. The submitted digital assets must satisfy quality requirements before such digital assets are permitted by the digital asset submission and management system 104 to be distributed by the media distribution site 102.

In the digital asset submission and distribution system 100 shown in FIG. 1, the digital assets are submitted to the digital asset submission and management system 104 by way of the digital asset submission program 118. The digital assets that have been submitted (e.g., via the second client 112) are processed and then stored in the digital asset storage device 106. The stored digital assets then undergo some processing, such as an encoding, so that the format of the stored digital assets is uniform and suitable for distribution. Additionally, the stored digital assets, before and/or after such processing, can be reviewed (e.g., for quality) by at least one reviewer. The review program 120 can be used by a reviewer to review and either approve or reject the stored digital assets. For rejected digital assets, the submitter can be notified and given the opportunity to correct the problem(s) and re-submit the corrected digital assets. The digital asset submission and management system 104 can also manage the review of digital assets associated with various digital assets submissions by a plurality of different reviewers.

Thereafter, the stored digital assets can be made available for purchase from the digital asset distribution site 102. Upon purchasing a particular digital asset, the digital asset distribution site 102 permits the digital data for the particular digital asset to be retrieved from the digital asset storage device 106 and then delivered (e.g., downloaded) from the digital asset distribution site 102 to the requesting client 110 through the data network 108. In this regard, the digital asset distribution site 102 or some other delivery server (not shown) obtains the digital data corresponding to the particular digital asset from the digital asset storage device 106 and downloads such digital data through the data network 108 to the client 110. The downloaded digital data can then be stored on the client 110. In one embodiment, the downloaded digital data is encrypted as received at the client 110 but is decrypted and then perhaps re-encrypted before persistently stored on the client 110. Thereafter, the client 110 can utilize (e.g., execute) the digital data of the digital asset at the client 110.

The digital asset submission and distribution system 100 allows a user of the client 110 to utilize the network access program 116 to browse, search or sort through a plurality of digital assets that can be purchased from the digital asset distribution site 102. The network access program 116 may also allow the user to preview or demo some or all of a digital asset. In the event that the user of the network access program 116 desires to purchase a particular digital asset, the user (via the network access program 116) and the digital asset distribution site 102 can engage in an online commerce transaction in which the user pays for access rights to the particular digital asset.

The submission and purchase of the digital assets can be achieved over the data network 108. In other words, the submission and purchase of the digital assets can be achieved online. The purchase of media items online can also be referred to as electronic commerce (e-commerce). In one embodiment, the data network 108 includes at least a portion of the Internet. The clients 110, 112, 114 can vary with application but generally are computing devices that have memory storage. Often, the clients 110, 112, 114 are personal computers or other computing devices that are capable of storing and presenting media to their users. In one embodiment, the connections through the data network 108 between the digital asset distribution site 102 and the clients 110, 112, 114 can be through secure connections, such as Secure Sockets Layer (SSL).

Although the digital asset distribution site 102, the digital asset submission and management system 104 and the digital asset storage device 106 are shown in FIG. 1 as being separate components, it should be understood that any of these components can be combined into one or more apparatus. For example, the digital asset submission and management system 104 can be incorporated into the digital asset distribution site 102. As another example, the digital asset storage device 106 can be incorporated into the digital asset distribution site 102 or the digital asset submission and management system 104.

The client (or client device) can, for example, be a computing device. Examples of a computing device include a personal computer (e.g., desktop computer, notebook computer or netbook computer), or a portable handheld electronic device (e.g., Portable Digital Assistant (PDA), multi-function mobile telephone).

Figure 2:
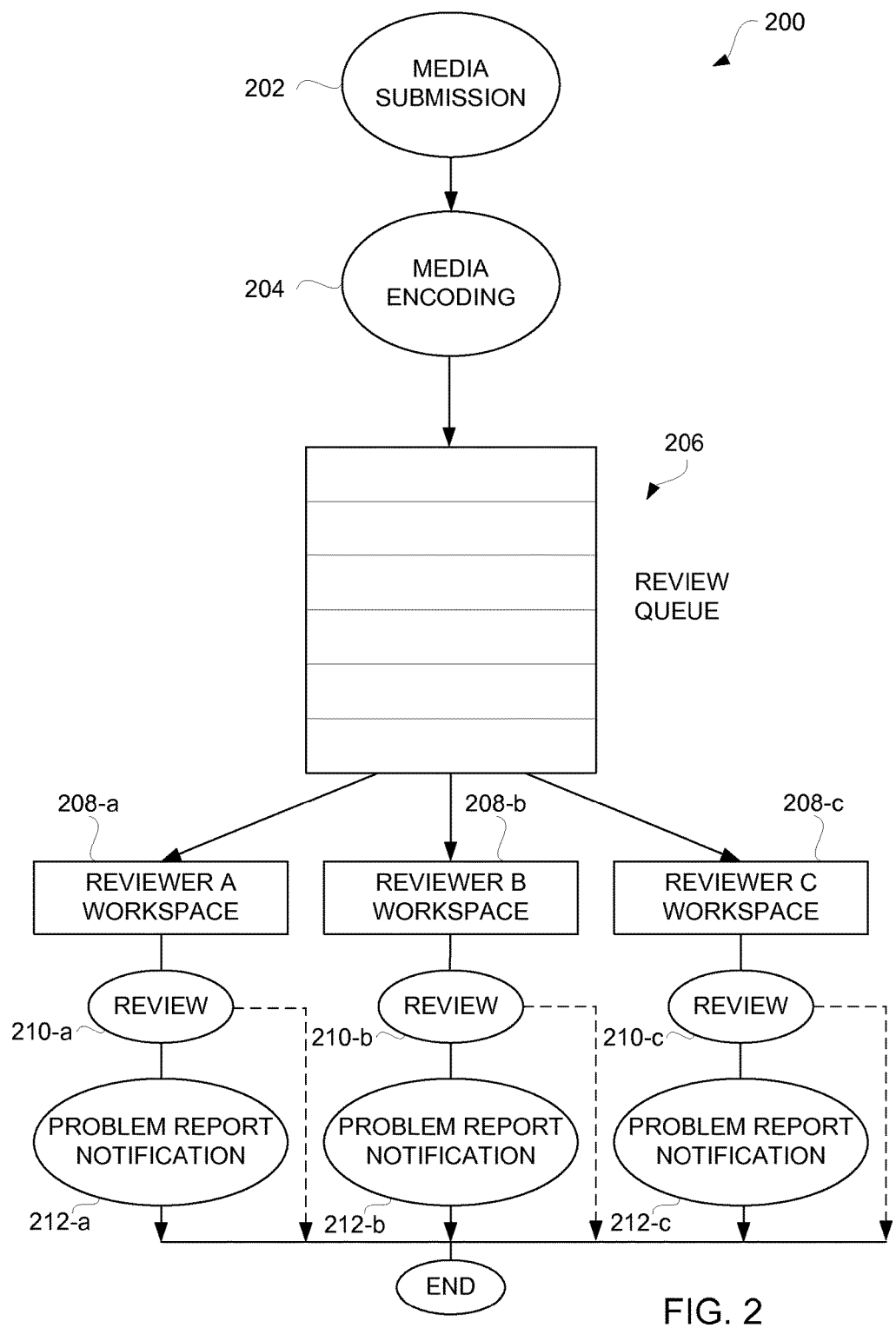
FIG. 2 illustrates a process flow diagram of a media submission and review process according to one embodiment.

FIG. 2 illustrate a process flow diagram of a media submission and review process 200 according to one embodiment. The media submission and review process 200 can include a media submission state, a media encoding state and a review state. These three states are illustrated in the media submission and review process 200.

The media submission and review process 200 can begin in a media submission state 202. The media submission state 202 represents a processing state in which media submissions are received. Typically, a media submission is provided by a submitter (e.g., content provider) as a digital media package including a plurality of electronic files that make up at least one digital media asset (such as a media title). For example, in the case of a digital video asset, the electronic files can include a video file, an audio file and a metadata file. Often there are multiple video files and audio files to support multiple resolutions, qualities or sizes as well as multiple languages.

The media submission state 202 can perform some validation checking with respect to the digital media package to ensure that it is properly formed and valid. Assuming that the digital media package has been successfully validated, the electronic files within the digital media package can be processed at a media encoding state 204. Here, at the media encoding state 204, the electronic files within the digital media package can be individually encoded into one or more encoding formats. For example, the network-based media distribution system can support a set of encoding formats, which can differ in resolution, security, quality and size, and the electronic files within the digital media package can be encoded to one or more of the encoding formats. Once the electronic files within the digital package has been successfully encoded as desired, the encoded electronic files (also referred to as components) can be directed to a review state.

The review state is a state of the media submission and review process 200 where the encoded electronic files (components) are reviewed for quality control. As a result of the review, the encoded electronic files can be individually approved or rejected. The review state, as shown in FIG. 2, can include a review queue 206, a reviewer workspace 208, a review 210, and a problem report and associated notification 212. Following the media encoding by the media encoding state 204, the encoded electronic files (components) can be stored in the review queue 206. Typically, the encoded electronic files for a given digital media assets would be grouped together so that they can be reviewed at the same time by a reviewer.

From the review queue 206, any of a plurality of reviewers are able to gain access to the encoded electronic files for review. In this regard, the media submission and review process 200 can provide or utilize a computerized workspace for each of the reviewers. As illustrated in FIG. 2, there are reviewers A, B and C, which respectively utilize reviewer A workspace 208-*a*, reviewer B workspace 208-*b*, and reviewer C workspace 208-*c*. When a digital media asset, namely, the encoded electronic files thereof, are provided to a reviewer workspace 208, the associated reviewer can then review 210 the digital media asset. For example, reviewer A would perform review 210-*a*, reviewer B would perform review 210-*b*, and reviewer C would perform review 210-*c*. If the review of the encoded electronic files being performed by the corresponding reviewer indicates approval thereof, the review process, can then end. On the other hand, if the review of the one or more encoded files being performed by the corresponding reviewer indicates rejection thereof, the review process can continue to provide a problem report and associated notification 212. For example, reviewer A would perform problem report notification 212-*a*, reviewer B would perform problem report notification 212-*b*, and reviewer C would perform problem report notification 212-*c*. Following the providing of the problem report notification 212, the media submission and review process 200 can end.

If the media package being submitted was fully approved, then the media associated with the media package can be configured for distribution. Alternatively, if the media package being submitted was not approved, the submitter (content provider) receives a notification that identifies the problem by way of the problem report. The submitter can then take action to correct the problem that has been identified with the digital media asset, and then resubmit at least the corrected portions thereof. The corrected media upon resubmission can then undergo similar processing by the media submission and review process 200. If should be noted that, in some embodiments, if a substantial portion of the electronic encoded files (components) of a digital media asset are approved, but some other less important one of the electronic encoded files are rejected, it is possible to also permit the digital media asset to be configured for distribution, at least to the extent that only the approved electronic encoded files are needed for distribution in a particular geographic area.

Figure 3A:
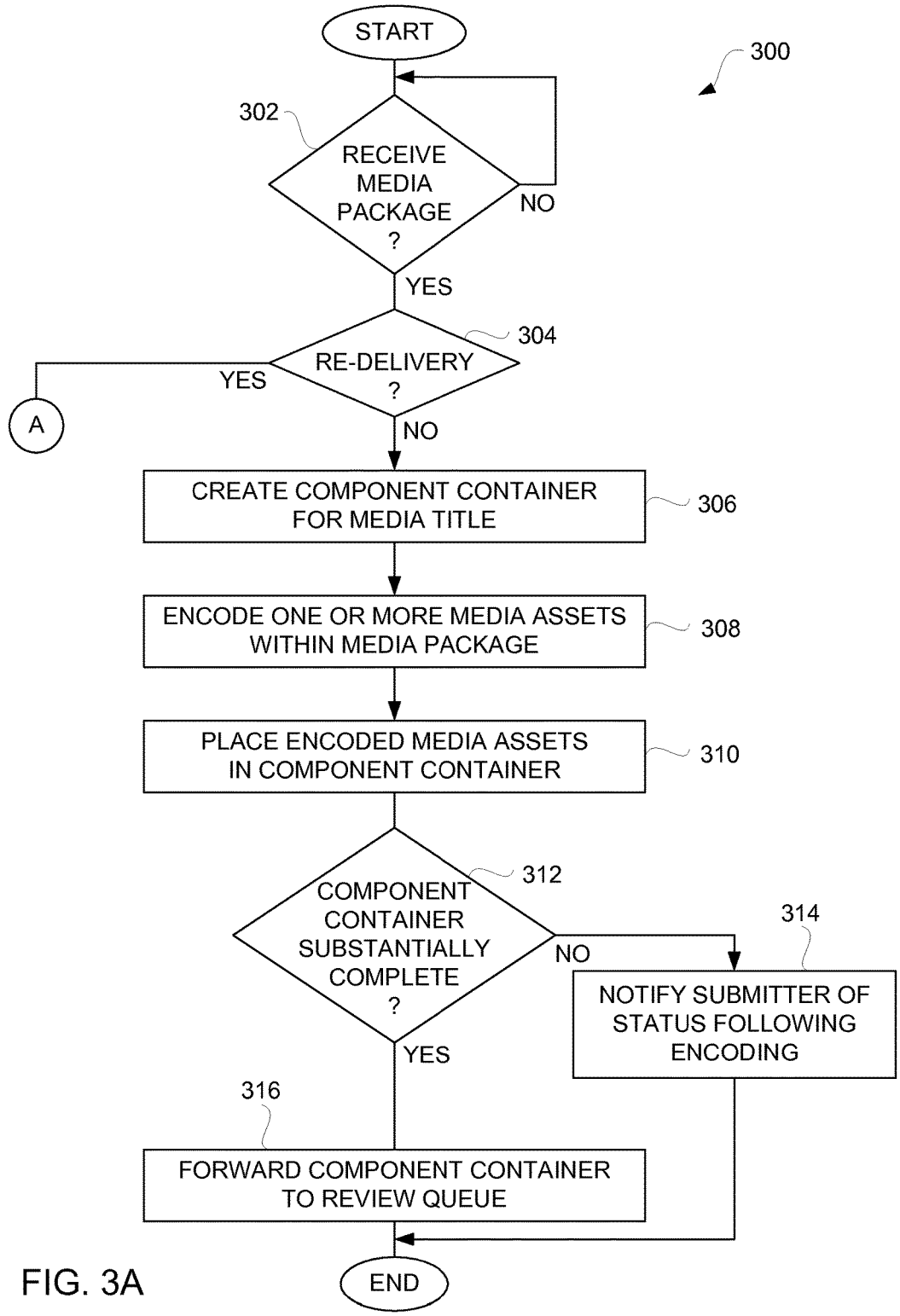
FIGS. 3A and 3B illustrate flow diagrams of a media package submission process according to one embodiment.
Figure 3B:
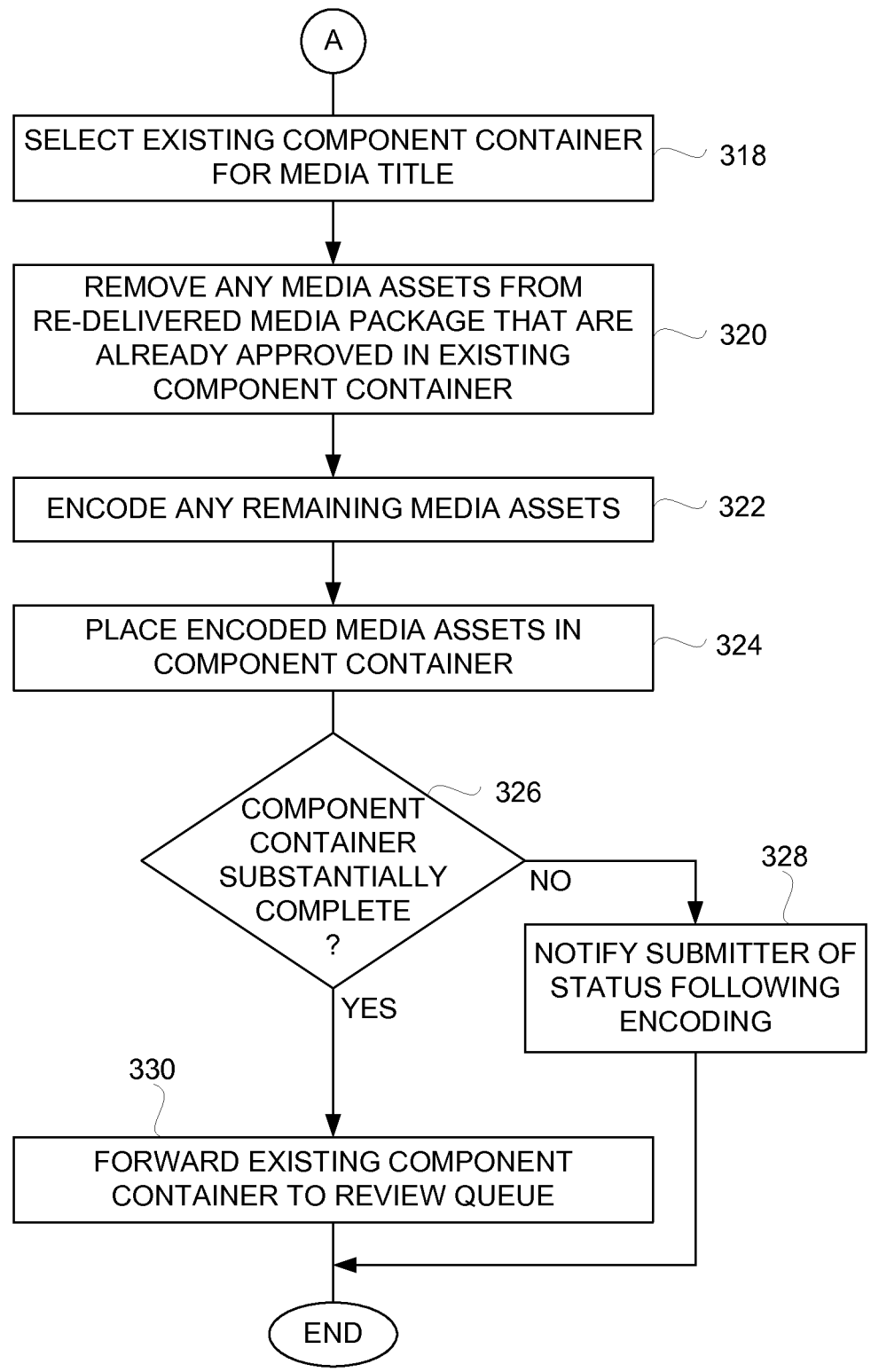

FIGS. 3A and 3B illustrate flow diagrams of a media package submission process 300 according to one embodiment. The media package submission process 300 can, for example, be performed by a computing device, such as the digital asset submission and management system 104 illustrated in FIG. 1.

The package submission process 300 can begin with a decision 302 that determines whether a media package has been received. The media package is associated with a media title and includes a plurality of media assets as electronic files. A content provider can prepare a media package and submit the media package to the computing device, such as the digital asset submission and management system 104. For example, the content provider can utilize the digital asset submission program 118 illustrated in FIG. 1 to prepare and submit the media package. The decision 302 can determine whether a media package has been received at the computing device (e.g., the digital asset submission and management system 104). When the decision 302 determines that a media package has not been received, the media package submission process 300 can await receipt of a media package. On the other hand, when the decision 302 determines that a media package has been received, additional processing can be performed to process the submitted media package.

After the media package has been received, a decision 304 can determine whether the media package received pertains to a re-delivery of a previously submitted media package. For example, upon submission of a media package, digital assets of the media package undergo encoding and a review process to determine whether the contents of the media package are acceptable for distribution. If the media package is determined to be at least partially unacceptable, the content provider can be informed and requested to resubmit another media package in which certain items are altered or corrected.

In any event, when the decision 304 determines that the received media package is not a re-delivery of a previously submitted media package, a component container for the media title associated with the received media package can be created 306. Next, one or more media assets within the received media package can be encoded 308. Each of the media assets may be encoded by one or more different encodings to provide one or more different formats. Exemplary formats include AAC, HD video, SD video, AppleTV, WAV, WMA, MPEG-4 and many more. After the one or more media assets have been encoded 308, the encoded media assets can be placed 310 in the component container that was created for the media title. Typically, at this point, the encoded media assets are identified as having a "review pending" status because such media assets that are not yet been reviewed.

Thereafter, a decision 312 can determine whether the container is substantially complete. Here, if the media assets within the component container are for the most part successfully encoded, the component container can be deemed substantially complete. In one implementation, a component container can be deeded substantially complete if at least primary components within the component container have been successfully encoded. In the case of a video title as the media title, the primary components can include a Standard Definition (SD) video file and a primary language stereo audio (e.g., English stereo).

When the decision 312 determines that the component container is not substantially complete, the submitter of the media package can be notified 314 of the status of the media package. For example, in this case, typically one or more media assets within the media package was not able to be successfully encoded and thus the submitter can be so notified so that the underlying media asset can be corrected and subsequently re-delivered. In this case, the component container is considered not sufficiently complete the problems with the one or more media assets have been corrected and re-submitted and, as a result, not further processed and/or evaluated until deemed at least substantially complete. On the other hand, when the decision 312 determines that the component container is substantially complete, the component container can be forwarded 316 to a review queue. The review queue can operate to store a plurality of component containers (more generally, media assets) that are ready to be reviewed by one or more reviewers. When storing the component containers to the review queue, a priority associated with the component container can be utilized, such that the component containers stored to the review queue are able to be prioritized (e.g., for subsequent review processing) in view of the priority associated with the corresponding component containers. Following the blocks 314 and 316, the media package submission process 300 can end.

On the other hand, when the decision 304 determines that the received media package is a re-delivery of a previously submitted media package, the media package submission process 300 can process the re-delivery in a more efficient manner such that previously reviewed components associated with the media package need not be re-reviewed. In any event, when the decision 304 determines that the received media package corresponds to a re-delivery of a previously submitted media package, the existing component container for the media title is selected 318. Here, since the component container for the media title already was formed, the component container can be located and reused. In an alternative embodiment, a new component container for the media title can be created. The new component container could be associated with the component container previously utilized.

After the existing component container has been selected (or created) 318, any media assets from the re-delivered media package that are already present and approved in the existing component container can be removed 320 from the component container used for the re-delivered media package. Here, the media assets being re-delivered are the same the corresponding media assets previously submitted and approved. Consequently, those media assets that are re-delivered but are the same as already approved media assets can be removed so that they are not again reviewed and approved. Media assets can be electronically compared to determine they are the same. In one implementation, a binary level comparison can be performed two determine whether two media assets are the same.

Following any removal 320, any remaining media assets within the component container can be encoded 322. The encoded media assets can then be placed 324 in the component container. Next, a decision 326 can determine whether the component container is substantially complete. When the decision 326 determines that the component container is not substantially complete, the submitter of the re-delivered media package can be notified 328 of the status following encoding. Typically, the status following encoding would indicate that one or more of the media assets within the re-delivered media package have not been successfully encoded. Alternatively, when the decision 326 determines that the component container is substantially complete, the component container can be forwarded 330 to the review queue. Following the blocks 328 and 330, the media package submission process 300 can end.

Figure 4:
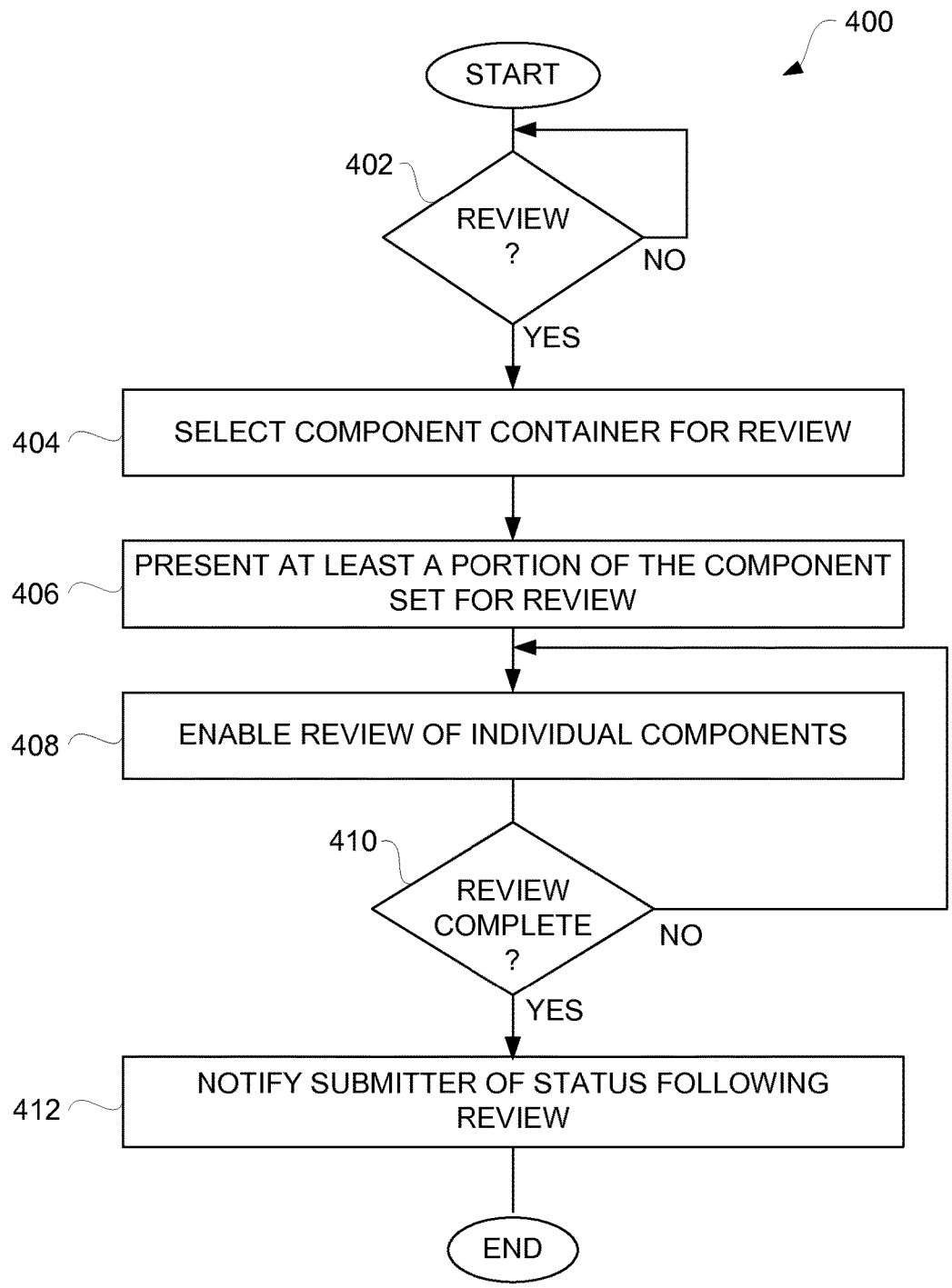
FIG. 4 illustrates a flow diagram of a media review process according to one embodiment.

FIG. 4 illustrates a flow diagram of a media review process 400 according to one embodiment. The media review process 400 can, for example, be performed by a computing device, such as the client machine 114 illustrated in FIG. 1.

The media review process 400 can include a decision 402 that determines whether a component container should be reviewed. In one embodiment, those component container awaiting review can be stored in a review queue. When the decision 402 determines that is either not desired or not needed, the media review process 400 can await until there is a determined need or desire to provide review. When the decision 402 determines that a component container should be reviewed, a component container is selected 404 for review. Typically, the component container can be selected 404 from a plurality of component containers stored in the review queue. The selection of the particular component container can be based on priorities of the plurality of component containers stored in the review queue. For example, the component container having the highest priority can be the particular component container selected. If the stored component containers have the same priority, the component container being stored in the review queue the longest can be selected.

After the component container for review has been selected 404, at least a portion of the components can be presented 406 for review. Typically, at least a portion of the components can be presented 406 by displaying indicia associated with the portion of the components on a display associated with the computing device performing the media review process 400. In addition, review of the individual components within the component container can be enabled 408.

A decision 410 can then determine whether review of the component container is complete. When the decision 410 determines that the review is not complete, the media review process 400 can return to repeat the block 408 so that additional components within the component container can be individually reviewed (and thus individually approved or rejected). Alternatively, when the decision 410 determines that the review of the component container is complete, the submitter of the media package associated with the component container can be notified 412 of the status of the components thereof. Following the block 412, the media review process 400 can end.

Figure 5A:
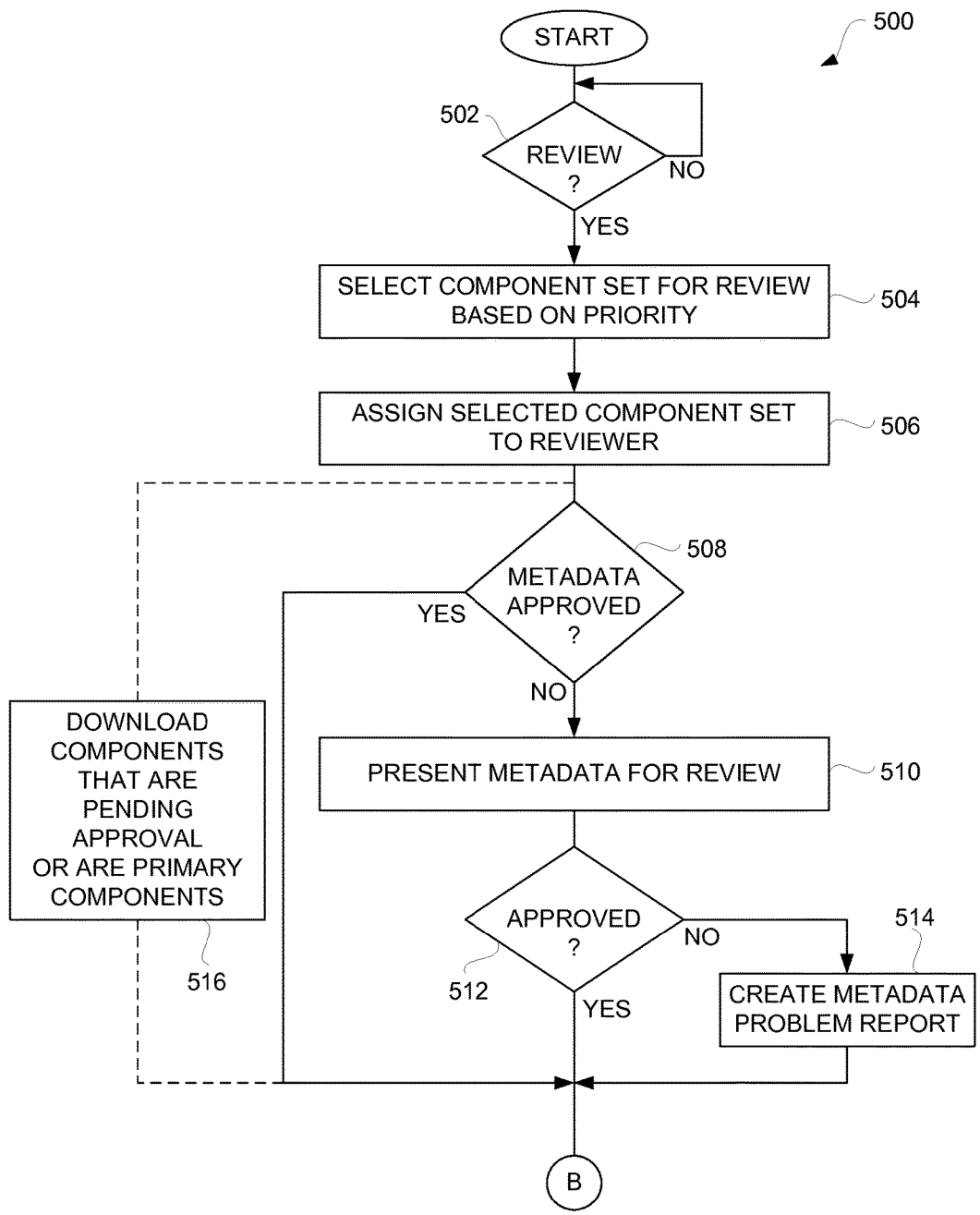
FIGS. 5A and 5B illustrate a media review process according to one embodiment.
Figure 5B:
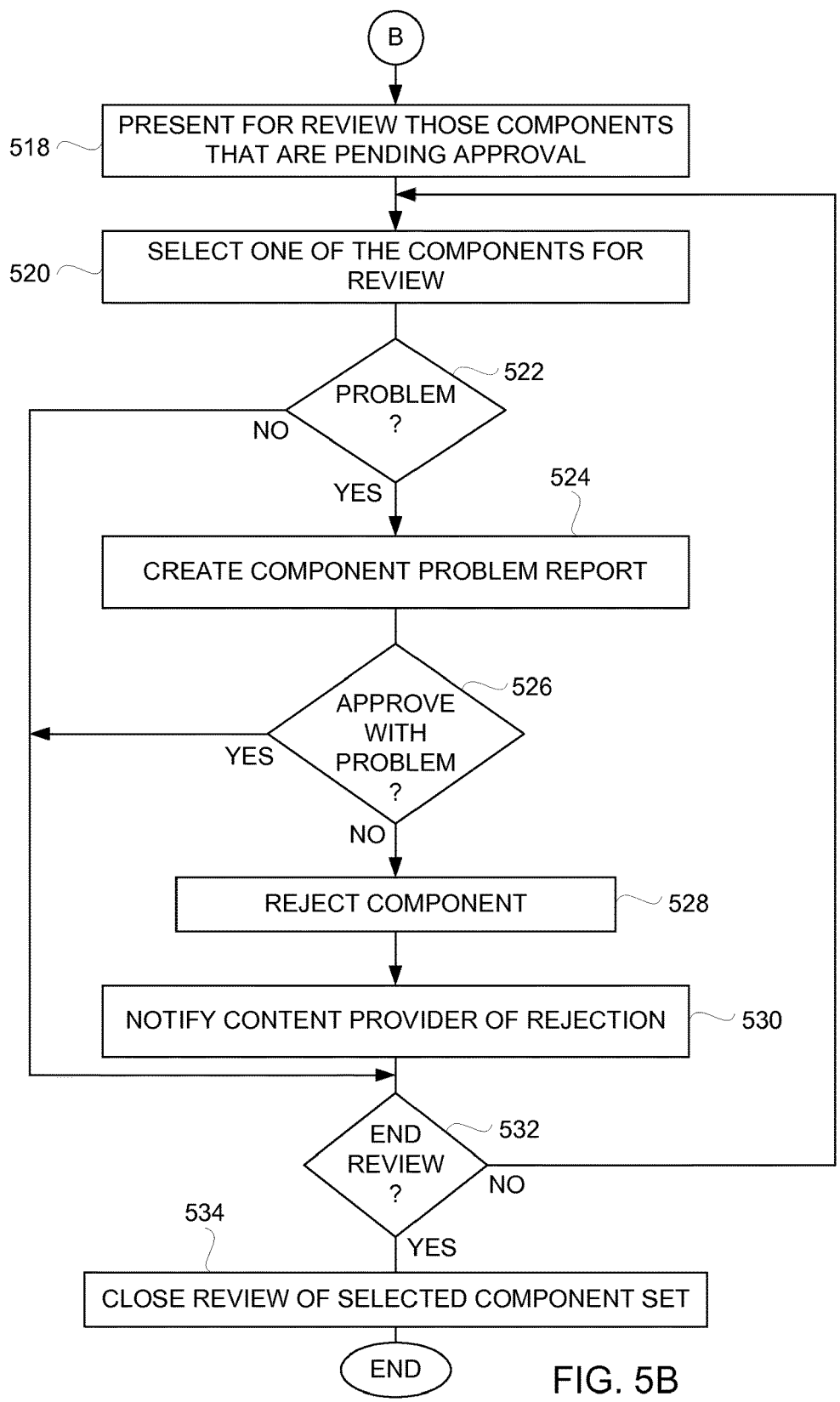

FIGS. 5A and 5B illustrate a media review process 500 according to one embodiment. The media review process 500 can be performed by a computing device, such as the client machine 114 illustrated in FIG. 1.

The media review process 500 can begin with a decision 502 that determines whether a review process should be initiated. When the decision 502 determines that a review process should not be initiated, the media review process 500 waits until a review process is to be initiated. Once the decision 502 determines that a review process should be initiated, a component set can be selected 504 for review based on priority. For example, a review queue can store a plurality of different component sets that are awaiting review. Each of the different component sets can have a priority associated there with. Hence, the selection 504 of a component set to be reviewed can be done such that the component set in the review queue having the highest priority can be selected.

After the component set for review has been selected 504, the selected component set can be assigned 506 to a reviewer. The reviewer is a person that is designated to view and/or listen to components within the selected component set. These components within the selected component set are associated with a particular media title.

After the selected components that have been assigned 504 to the reviewer, a decision 508 can determine whether metadata for the media title is approved. Here, the metadata for the media title can be displayed on the computing device, and the reviewer is able to review the metadata. The reviewer may also be permitted to edit the metadata, i.e., so as to make corrections that may be needed. The decision 508 can determine whether the metadata has been approved by the reviewer. When the decision 508 determines that the metadata has been approved, the reviewer is able to subsequently review the media components within the selected component set.

When the decision 508 determines that the metadata for the media title is not already approved, the metadata for review can be presented 510. For example, the metadata for the media title can be presented 510 on a display device associated with the computing device being utilized by the reviewer. The reviewer can then review the metadata being presented 510. The reviewer can thus determine whether to approve or reject the metadata. If the metadata is rejected, a problem with the metadata can be indicated. The reviewer can also be permitted to edit the metadata.

A decision 512 can then determine whether the reviewer has approved the metadata. When the decision 512 determines that the reviewer has not approved the metadata, the metadata problem report can be created 514. The metadata problem report is eventually provided to the submitter (or content provider) for the media title being reviewed. Alternatively, when the decision 512 determines that the metadata has been approved, as well as following the block 514, the media review process 500 can proceed to facilitate review of the media components provided within the selected component set.

Additionally, as an optional enhancement, the media review process 500 can also download 516 components that are pending approval or are primary components. By downloading 516 the components that are pending approval (or are primary components) to the computing device being utilized by the reviewer, the components (e.g., digital media assets) to be reviewed are thus stored locally and available to be rapidly retrieved. As shown in FIG. 5A, the downloading 516 of the components that are pending approval (as well as primary components otherwise needed for review) can be performed in parallel with the operations associated with the reviewer reviewing the metadata for the media title. The primary components are typically needed to intelligently present other ones of the components; hence, their download can occur regardless of whether the primary components need to be approved.

Next, following blocks 514 and 516 as well as following the decision 508 (when metadata has been previously approved) or following the decision 512 (when metadata is approved), those components within the selected component set that are pending approval can be presented 518. Again, the components can be presented 518 with the assistance of a computing device being utilized by the reviewer. For example, the components that are pending approval can be listed on a display device associated with the computing device. Next, one of the components to be reviewed can be selected 520. Once one of the components to be reviewed is selected 520, the selected component can be reviewed by the reviewer. A decision 522 can determine whether the selected component has problem. When the decision 520 determines that the reviewer concludes that the selected component has a problem, a problem report can be created 524 to identify the problem that has been identified by the reviewer with respect to the selected component.

After the problem report for the selected component has been created 524, a decision 526 can determine whether the selected component can be approved even with the problem. For example, when the problem is sufficiently minor in character, it may still be appropriate to approve the selected component. Alternatively, when the decision 526 determines that given the problem with the selected component, the selected component is not being approved, then the selected component can be rejected 528. In addition, the content provider of the media title associated with the selected component can be notified 530 of the rejection.

Thereafter, a decision 532 can determine whether the review of the selected component set should end. When the decision 532 determines that the review of the selected component said should not end, the media review process 500 can return to repeat the block 520 and subsequent blocks so that another component of the selected components that can be selected and similarly processed. Alternatively, when the decision 532 determines that the review of the selected component should end, the review of the selected component set closes 534. Any notifications that have been accumulated but not sent, can also be sent, even in a consolidated manner, to the content provider of the media title associated with the selected component set. After the review of the selected components that has been closed 534, the media review process 500 can end.

Figure 6:
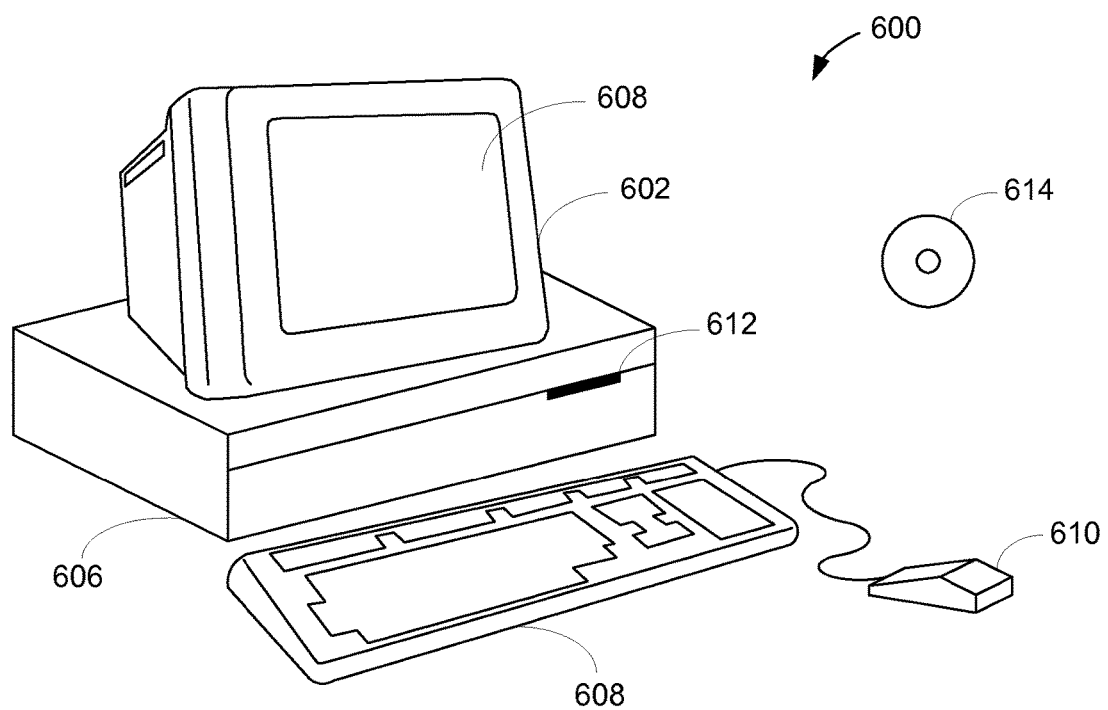
FIG. 6 shows an exemplary computer system suitable for use with embodiments.

FIG. 6 shows an exemplary computer system. One or more of the exemplary computer systems are suitable for use with at least one embodiment of the invention. The computer system 600 includes a display monitor 602 having a single or multi-screen display 604 (or multiple displays), a cabinet 606, a keyboard 608, and a mouse 610. The cabinet 606 houses a drive 612, such as for receiving a CD-ROM 614, a system memory and a mass storage device (e.g., hard drive or solid-state drive) (not shown) which may be utilized to store retrievable software programs incorporating computer code that implements the embodiment of the invention, data for use with embodiment(s) of the invention, and the like. Although the CD-ROM 614 is shown as an exemplary computer readable medium, other computer readable digital video including floppy disk, tape, flash memory, system memory, and hard drive may be utilized.

The various aspects, features, embodiments or implementations of the invention described above can be used alone or in various combinations.

Embodiments of the invention can be implemented by software, hardware, or a combination of hardware and software. Embodiments of the invention can also be embodied as computer readable code on a computer readable medium. The computer readable medium is any data storage device that can store data which can thereafter be read by a computer system. Examples of the computer readable medium generally include read-only memory and random-access memory. More specific examples of computer readable medium are tangible and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

The advantages of the invention are numerous. Different embodiments or implementations may, but need not, yield one or more of the following advantages. One advantage of at least some embodiment is that individual components that are associated with a digital media asset (e.g., media title) can be individually reviewed, which provides increased efficiency for assessment of media quality. Another advantage of at least some embodiment is that a reviewer's workspace can focus and assist with reviewing those components associated with a digital media asset that are not yet approved. Still another advantage of at least some embodiment is that a plurality of reviewers can review various media assets that have been submitted to a network-based media distribution system for distribution in a prioritized manner.

The many features and advantages of the invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A computer-implemented method for reviewing digital assets to be made available through a media distribution system, the method comprising:

receiving, at one or more processors, component data for a first digital asset, the component data comprising a plurality of encoded media files for the first digital asset;

validating, prior to submission to a reviewer device, that the component data for the first digital asset satisfies one or more requirements;

causing display of a user interface to present two or more non-approved media files of the plurality of encoded media files for the first digital asset included in the component data, wherein the user interface is configured to present each of the two or more non-approved media files of the first digital asset to be reviewed separately from each other; and making available the first digital asset for distribution by the media distribution system in response to receiving messages indicating approval of each of a designated subset of files of the plurality of encoded media files for the first digital asset, wherein the designated subset is associated with a particular geographical region, and wherein making available the first digital asset for distribution by the media distribution system includes making available the first digital asset for distribution to the particular geographical region.

2. The method as recited in claim 1, wherein the method comprises:

recording an approval or rejection for each of the two or more non-approved media files.

3. The method as recited in claim 1, wherein the method comprises:

receiving an approval for at least one but not all of the two or more non-approved media files of the component data; and recording the approval for the at least one but not all of the two or more non-approved media files of the component data.

4. The method as recited in claim 1, wherein the user interface is configured to support individual playback of the two or more non-approved media files of the component data.

5. A method for reviewing digital media files for a media asset to be made available to or at a media distribution system, the method comprising:

selecting, at one or more processors, a component set associated with a first digital asset for review, the selected component set comprising two or more non-approved media files of the first digital asset;

validating, prior to submission to a reviewer device, that the component set associated with the first digital asset satisfies one or more validation requirements;

assigning the component set to the reviewer device;

presenting, via a user interface associated with the reviewer device, metadata of the first digital asset associated with the selected component set;

receiving an indication of approval, rejection, or modification of the metadata of the first digital asset;

presenting, via the user interface, the two or more non-approved media files of the first digital asset for review, wherein the user interface is configured to present each of the two or more non-approved media files of the first digital asset to be reviewed separately from each other;

receiving an indication of approval or rejection of individual media files from the two or more non-approved media files of the first digital asset; and making available the first digital asset for distribution by the media distribution system in response to receiving messages indicating approval of each of a designated subset of files of the two or more non-approved media files for the first digital asset, wherein the designated subset is associated with a particular geographical region, and wherein making available the first digital asset for distribution by the media distribution system includes making available the first digital asset for distribution to the particular geographical region.

6. The method as recited in claim 5, wherein receiving the indication of approval or rejection of the individual media files of the two or more non-approved media files comprises:
receiving an approval indication with a problem for at least one of the individual media files.

7. The method as recited in claim 5, wherein receiving the indication of approval or rejection of the individual media files of the two or more non-approved media files comprises:
receiving a selection of one of the individual media files; and receiving an indication of a problem with the selected media file.

8. The method as recited in claim 7, wherein receiving the indication of approval or rejection of the individual media files of the two or more non-approved media files comprises:
after receiving the indication of the problem, receiving an indication of approval of the selected media file.

9. The method as recited in claim 7, wherein receiving the indication of approval or rejection of the individual media files of the two or more non-approved media files comprises:
after receiving the indication of the problem, receiving an indication of rejection of the selected media file.

10. The method as recited in claim 7, wherein the first digital asset is associated with a content provider, and wherein receiving the indication of approval or rejection of the individual media files of the two or more non-approved media files comprises:
after receiving the indication of the problem, receiving an indication of rejection of the selected media file; and
notifying the content provider of the problem with the selected media file.

11. At least one non-transitory computer readable medium comprising:
instructions stored thereon, which when executed by one or more processors, cause the one or more processors to:
receive component data for a first digital asset, the component data comprising a plurality of media files of the first digital asset;
prior to submission to a reviewer device, validate that the component data for the first digital asset satisfies one or more validation requirements;
generate a user interface to display two or more non-approved media files of the plurality of media files of the first digital asset included in the component data, wherein the user interface is configured to present each of the two or more non-approved media files of the component data to be reviewed separately;
receive one or more messages indicating individual approval of one or more of the two or more non-approved media files of the component data; and
make available the first digital asset for distribution by a media distribution system in response to receiving messages indicating approval of each of a designated subset of files of the plurality of media files for the first digital asset, wherein the designated subset is associated with a particular geographical region, and wherein making available the first digital asset for distribution by the media distribution system includes making available the first digital asset for distribution to the particular geographical region.

12. At least one non-transitory computer readable medium comprising:
instructions stored thereon, which when executed by one or more processors, cause the one or more processors to:
select a component set for review, the component being associated with a first digital asset, the component set comprising two or more non-approved digital media files of the first digital asset;
validate, prior to submission to a reviewer device, that the component set associated with the first digital asset satisfies one or more validation requirements;
assign the component set to a reviewer;
present, via a user interface associated with the reviewer device, metadata of the first digital asset associated with the component set;
receive a first indication of approval, rejection, or modification of the metadata of the first digital asset;
present, via the user interface, the two or more non-approved digital media files of the component set for review, wherein the user interface is configured to present each of the two or more non-approved digital media files of the component set to be reviewed separately from each other;
receive an indication of approval or rejection of individual media files from the two or more non-approved digital media files; and
make available the first digital asset for distribution by a media distribution system in response to receiving messages indicating approval of each of a designated subset of files of the two or more non-approved digital media files for the first digital asset, wherein the designated subset is associated with a particular geographical region, and wherein making available the first digital asset for distribution by the media distribution system includes making available the first digital asset for distribution to the particular geographical region.

13. A computer-implemented method for reviewing digital media assets comprising:
receiving, at one or more processors, a submission of component data comprising two or more electronic files for a first digital asset;
validating that the component data satisfies one or more requirements;
individually encoding each of the two or more electronic files into one or more encoding formats to yield a plurality of encoded electronic files;
upon validation that the component data satisfies the one or more requirements and encoding each of the two or more electronic files, initiating display of a user interface configured to present the two or more encoded electronic files to be reviewed separately from each other; and
making available the first digital asset for distribution by a media distribution system in response to receiving messages indicating approval of each of a designated subset of files of the two or more electronic files for the first digital asset, wherein the designated subset is associated with a particular geographical region, and wherein making available the first digital asset for distribution by the media distribution system includes making available the first digital asset for distribution to the particular geographical region.

14. The computer-implemented method of claim 1, wherein the two or more non-approved media files include a first file and a second file, the first file storing a first version of video content of the first digital asset and the second file storing a second version of the video content of the first digital asset.

15. The computer-implemented method of claim 14, wherein the first version of the video content has a first resolution and the second version of the video content has a second resolution.

16. The computer-implemented method of claim 1, wherein the two or more non-approved media files include a first file and a second file, the first file storing a first version of audio content of the first digital asset and the second file storing a second version of the audio content of the first digital asset.

17. The computer-implemented method of claim 16, wherein the first version of the audio content includes dialogue recorded in a first language and the second version of the audio content has includes the dialogue recorded in a second language.

18. The computer-implemented method of claim 1, wherein the two or more non-approved media files include a first file and a second file, the first file storing audio content of the first digital asset and the second file storing video content of the first digital asset.

19. The computer-implemented method of claim 1, further comprising:

receiving one or more messages indicating rejection of a first media file of the two or more non-approved media files and approval of a second media file of the two or more non-approved media files; and transmitting a request for resubmission of one or more rejected media files associated with the first digital asset, the request identifying the first media file in response to the rejection.

* * * * *